(12) United States Patent
Wei et al.

(10) Patent No.: US 7,398,464 B1
(45) Date of Patent: Jul. 8, 2008

(54) SYSTEM AND METHOD FOR CONVERTING AN ELECTRONICALLY STORED DOCUMENT

(75) Inventors: Ran Wei, Mountain View, CA (US); Anindo Roy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 494 days.

(21) Appl. No.: 10/158,969

(22) Filed: May 31, 2002

(51) Int. Cl.
*G06F 17/00* (2006.01)
(52) U.S. Cl. .................. 715/239; 715/210; 715/249; 715/255
(58) Field of Classification Search ............... 715/513, 715/515, 516, 530, 523, 501.1, 239, 210, 715/249, 255
See application file for complete search history.

(56) References Cited

U.S. PATENT DOCUMENTS

| | | | | |
|---|---|---|---|---|
| 6,369,835 B1 * | 4/2002 | Lin | ............................. | 715/726 |
| 6,662,186 B1 * | 12/2003 | Esquibel et al. | ............. | 707/101 |
| 6,732,915 B1 * | 5/2004 | Nelson et al. | ................ | 235/375 |
| 2002/0016800 A1 * | 2/2002 | Spivak et al. | ................ | 707/523 |
| 2002/0103864 A1 * | 8/2002 | Rodman et al. | ............. | 709/204 |
| 2002/0194227 A1 * | 12/2002 | Day et al. | .................... | 707/523 |
| 2003/0028562 A1 * | 2/2003 | Shaughnessy et al. | ........ | 707/513 |
| 2003/0033331 A1 * | 2/2003 | Sena et al. | ................... | 707/513 |
| 2003/0145023 A1 * | 7/2003 | Bennett et al. | .............. | 707/205 |
| 2004/0039848 A1 * | 2/2004 | Estrada et al. | .............. | 709/315 |
| 2004/0205616 A1 * | 10/2004 | Rosenberg et al. | ........... | 715/523 |

OTHER PUBLICATIONS

Bell, Gordon, "A Personal Digital Store", Communications of the ACM, vol. 44, Issue 1, Jan. 2001, pp. 86-1.*
Vora, Pawan R., "Design/Methods & Tools: Designing for the Web: A Survey", Interactions, vol. 5, Issue 3, May 1998, pp. 13-30.*
Phelps, Thomas A., et al, "The Multivalent Browser: A Platform for New Ideas", Proceedings of the 2001 ACM Symposium on Document Engineering, Nov. 2001, pp. 58-67.*
Harrell, Charles R., et al, "Simulation Software Component Architecture for Simulation-Based Enterprise Applications", Proceedings of the 30th Conference on Winter Simulation, Dec. 1998, pp. 1717-1721.*
Moore, A.C., "Conversion of Engineering Drawings to Digital Form", Proceedings of the Share Design Automation Project, Jan. 1965, pp. 1-9.*
Moseley, Lonnie E., et al Mastering Office 97 Professional Edition, Sybex, 1997, pp. 638.*

* cited by examiner

*Primary Examiner*—William L. Bashore
*Assistant Examiner*—Laurie Ries
(74) *Attorney, Agent, or Firm*—Park, Vaughan & Fleming LLP

(57) ABSTRACT

A system and method for producing a document formatted according to Hypertext Markup Language (HTML) from an electronically stored original document while preserving the visual presentation properties of the original document as characterized by the document-authoring application used to create the original document. The system comprises a document converter, which includes a conversion engine and an interface for a document-authoring application. The document-authoring application interface generates a set of raw conversion data from the original document. The conversion engine assembles the raw conversion data into the HTML document. The raw conversion data may comprise a set of files formatted according to Hypertext Markup Language (HTML).

21 Claims, 3 Drawing Sheets

SYSTEM AND METHOD FOR CONVERTING AN ELECTRONICALLY STORED DOCUMENT

BACKGROUND

This invention relates generally to the field of computer systems. More particularly, a system and methods are provided for producing a document formatted according to Hypertext Markup Language (HTML), or another portable format, from an electronically stored original document, while preserving the visual presentation properties of the original document. Thus, the document that is produced retains visual presentation properties instilled by the document-authoring application used to create the original document.

As a result of the expanding mobile workforce, the proliferation of the Internet, the popularity of the World Wide Web, corporate and home based local area networks (LANs), and wide area networks (WANs), server and network based collaboration is increasingly being used to support collaboration within work groups as well as non-work-related groups.

Server and web-based collaboration can provide an individual a convenient and cost-effective means of sharing a document simultaneously with a group of people who may not be available for an in-person meeting. Often, attendees of a "virtual" collaboration meeting utilize wired and wireless network-capable browser devices, such as thin-client terminals, to display a shared document from a server.

Thin-client browser devices can be advantageous in a collaboration system. They tend to provide lower technology costs, more reliable computing devices, easier to use interfaces, and lower maintenance requirements than a more complex client device such as a personal computer or a workstation.

Online document storage systems and many server based collaboration systems allow an individual to upload documents to a server or a secure DBMS (Database Management System) such as Oracle® Server by Oracle Corporation, where others can access them. Frequently, individuals create these documents to be shared using document-authoring applications such as Microsoft® Corporation's PowerPoint, Word, Excel, Project, Visio, etc.

Many document-authoring applications can generate documents with complex design, layout and visual presentation schemes. Individuals often expend a great deal of time and energy polishing the appearance of a document by adjusting the text arrangement, the background colors, the graphics and other visual presentation attributes of the document.

Unfortunately, some collaboration systems discard or alter visual presentation properties of an original document when preparing the document for collaboration. In particular, the original document may need to be presented on multiple types of devices having a range of presentation interfaces or display capabilities. The shared document may end up much less attractive and/or understandable in comparison to the original document as viewed in the document-authoring application that created the original document.

Also, some collaboration systems rely on client-side document conversion or document presentation methods to allow a shared document to be viewed by the attendees of a collaboration meeting. This approach to collaboration necessitates a meeting attendee's use of a client-side personal computer or workstation rather than a thin-client device. Often, the necessary client-side software is only available for a specific computing platform or computer operating system, and, as a further inconvenience, each meeting attendee must install the software on the computer or workstation in order to view a shared document.

As a result, potential attendees of a collaboration meeting may not be able to participate if they do not have access to a personal computer or the required client-side software.

Thus, there is a need in the art for an automated method of producing a document formatted according to Hypertext Markup Language (or other transportable format), from an original document created with a document-authoring application that preserves visual presentation properties of the original document, without requiring specialized client-side tools.

SUMMARY

In one embodiment of the invention, a system and methods are provided for producing a document formatted according to Hypertext Markup Language (HTML) from an original electronically stored document. The produced document preserves visual presentation properties of the original document, as characterized by the document-authoring application used to create the original document. Generation of the HTML document, on a server, may be initiated by a document converter in response to a conversion request from a client or other server.

In one embodiment of the invention, a conversion engine, executing in a document converter, produces an HTML formatted document from an original document. The conversion engine calls upon a subset of the functionality comprising the document-authoring application that created the original document to generate one or more document fragments from the original document. The generated document fragments preserve the visual presentation properties of the original document, as defined by the document-authoring application used to create the original document.

The conversion engine, while maintaining visual presentation properties of the original document, assembles the generated document fragments into a browser-neutral document formatted according to Hypertext Markup Language. The document converter, as a reply to a user initiated conversion request, may generate a document conversion response.

In an embodiment of the invention, the document converter is implemented as a web service.

DETAILED DESCRIPTION

Figure 1:
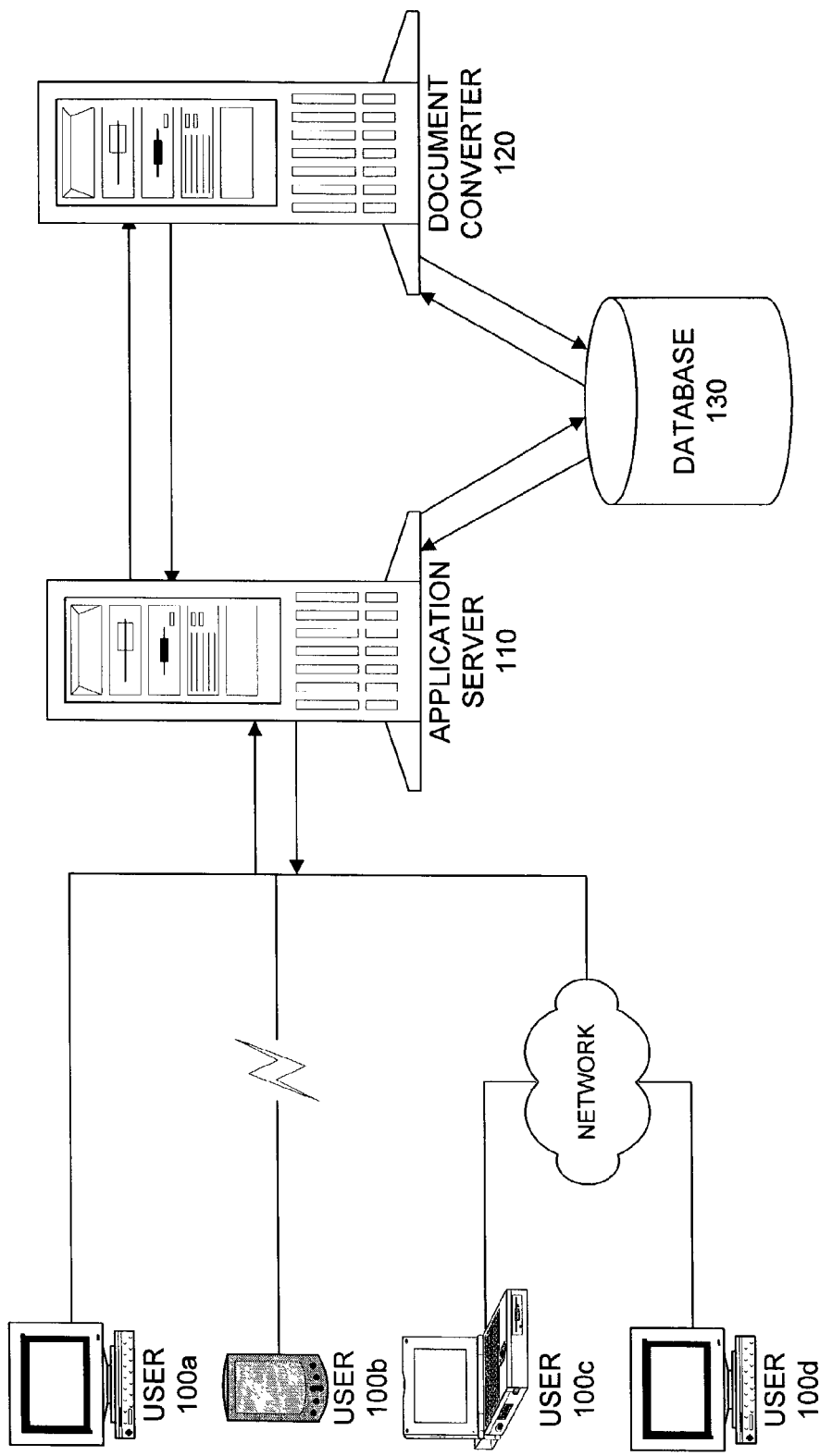
FIG. 1 depicts a system in which an HTML document may be produced in response to a user request to convert the storage format of an electronically stored original document, without losing a visual presentation property of the original document, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In embodiments of the invention described herein, systems and methods are provided for producing a document formatted according to Hypertext Markup Language (HTML), or some other transportable format, from an electronically stored original document, while preserving visual presentation properties of the original document, as characterized by the document-authoring application used to create the original document.

In an embodiment of the invention, the presentation format of a document may encompass external characteristics or visual presentation properties of the document including, but not limited to, content, design, foreground and background colors, images, margins, textual fonts and overall visual appearance. A presentation format of a document may be unique to a document-authoring application. A user may create and/or modify a presentation format of a document by adding or changing content or images in a document, by setting textual font types, margins, etc., or by modifying a layout or organizational scheme of a document.

The storage format of a document represents a form in which a presentation format may be captured as an electronic image, including the originality and creativity of the document. A storage format may be determined by a pre-defined set of rules or specifications for a presentation format or a property of a presentation format.

A particular presentation format may be compatible with multiple storage formats. A document-authoring application, such as a word processor or spreadsheet, will often manipulate a storage format of a document by maintaining an electronic representation image of a document within a shared memory in a computer system as a document is created or modified. Further, a document-authoring application may store or retrieve a document in a non-volatile storage device.

FIG. 1 depicts a system in which an HTML document may be produced in response to a user request to convert the storage format of an electronically stored original document, according to one embodiment of the invention.

In other embodiments of the invention, the final document may be produced in a particular type of HTML, such as Dynamic Hypertext Markup Language (DHTML), or some language other than HTML.

In the illustrated embodiment of the invention, the system comprises user 100$a$, user 100$b$, user 100$c$, user 100$d$, application server 110, document converter 120 and database 130.

Users 100$a$, 100$b$, 100$c$, and 100$d$ depict browser enabled thin-client devices able to communicate document conversion requests to application server 110. Illustratively, user 100$a$ is directly wired to application server 110. User 100$b$ communicates with application server 110 over a wireless link, and users 100$c$ and 100$d$ are communicating with application server 110 via a network, such as the Internet. In another embodiment of the invention, a user device may comprise a personal computer or workstation configured to execute a browser application.

Application server 110 is configured to receive document conversion requests from users 100$a$, 100$b$, 100$c$ and 100$d$. Further, application server 110 is configured to upload an original document to be converted from the users, and to serve the HTML document produced by document converter 120 to the requesting user. Application server 100 may store a user's original document in database 130 and/or retrieve an HTML document, produced by document converter 120, from database 130. In addition, application server 110 is configured to send document conversion requests to document converter 120, and to receive document conversion responses from document converter 120.

Document converter 120 produces the HTML document from the original document. Either or both of the original document and the produced HTML document may be stored in database 130. The produced HTML document preserves substantially all the visual presentation properties of the original document, as defined by the document-authoring application that created the original document.

In this embodiment of the invention, a user may initiate a document conversion request by submitting a Uniform Resource Locator (URL) comprising a reference to an original document to application server 110. Upon receiving the request, application server 110 uploads the original document from the user, stores it in database 130 and passes a conversion request to document converter 120. In this embodiment of the invention, the conversion request comprises the name of the original document and the location of the original document in the database. In another embodiment of the invention, the conversion request may include other information, such as database login information or document conversion parameters.

Document converter 120 retrieves the original document from database 130, and determines the document-authoring application that created the original document. Document converter 120 then produces the HTML document from the original document by executing or calling upon a subset of the functionality of the identified document-authoring application, and stores the HTML document in database 130.

In response to a document conversion response notification from document converter 120, application server 110 retrieves the HTML document from database 130, and serves the HTML document to the browser application executing on the user's device.

In an alternative embodiment of the invention, either application server 110 or document converter 120 may comprise the other, and/or database 130.

Figure 2:
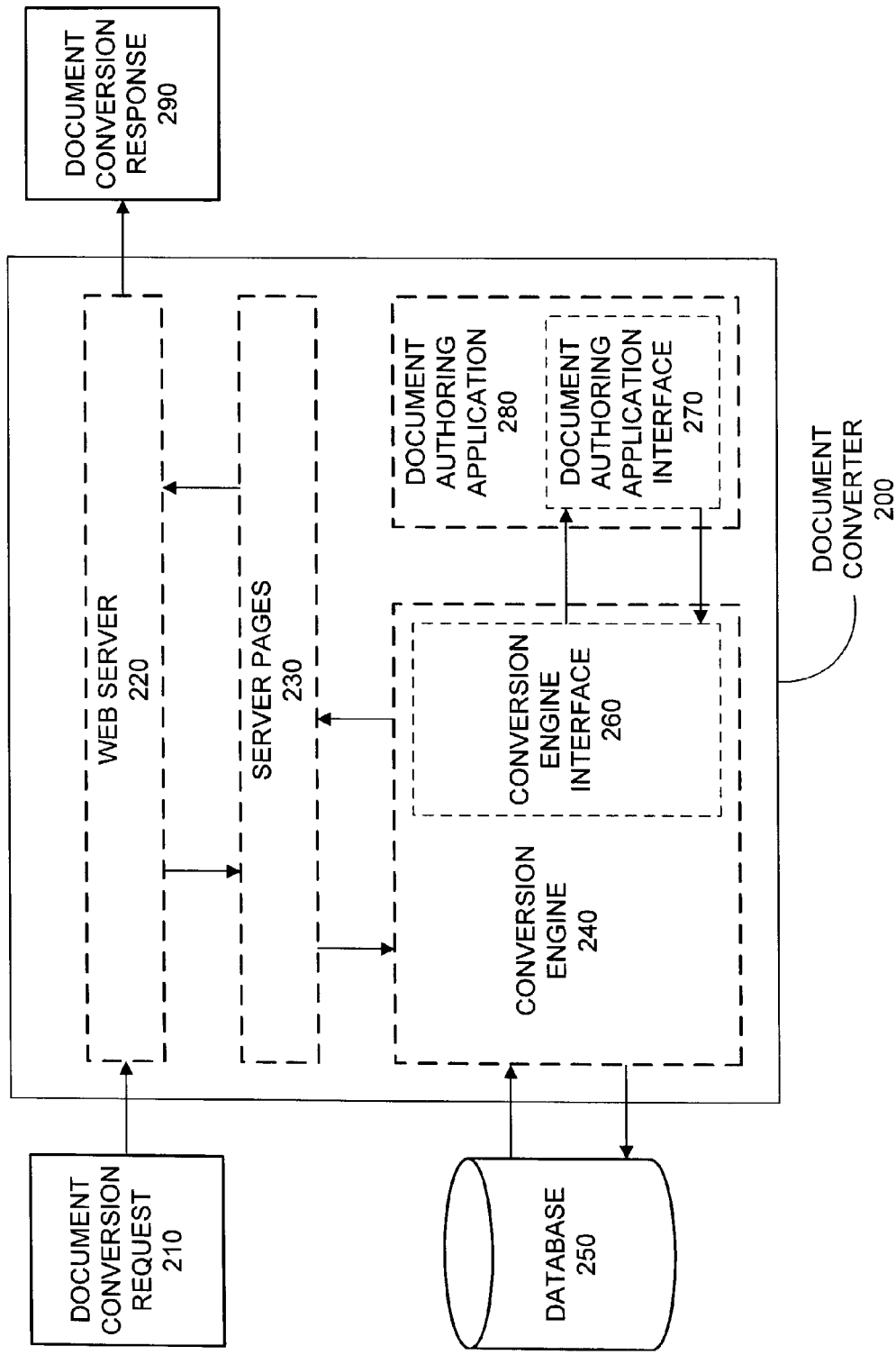
FIG. 2 depicts a document converter, in accordance with an embodiment of the invention.

FIG. 2 depicts a document converter for producing an HTML document from an original document, in accordance with an embodiment of the invention. In this embodiment of the invention, document converter 200 receives a document conversion request, retrieves an original document from a database, produces a document formatted according to Hypertext Markup Language (HTML) from the original document, stores the produced HTML document in a database and replies to the document conversion request with a document conversion response.

The HTML document produced by document converter 200 preserves all visual presentation properties, or virtually all visual presentation properties of the original document, as characterized by the document-authoring application used to create the original document.

Document converter 200 comprises web server 220, server pages 230, conversion engine 240, conversion engine interface 260, document authoring application interface 270, and document authoring application 280. In this embodiment of the invention, document authoring application 280 comprises a subset of the functionality of the application used to create the original document, and also comprises document authoring application interface 270.

In document converter 200, web server 220 receives document conversion request 210. In this embodiment of the invention, the conversion request may comprise a Uniform Resource Locator (URL) reference to an original document. The URL reference may comprise the name and the storage location of the original document. In another embodiment of the invention, the conversion request may comprise different or additional information, such as database login information, document conversion parameters, the name of the document-authoring application that created the original document or the name of a target browser application that the produced HTML document will be viewed in.

Web server 220 passes document conversion request 210 to server pages 230. In this embodiment of the invention, server pages 230 configure the information contained in document conversion request 210 into a format that can be utilized by conversion engine 240. Server pages 230 pass the document conversion request information, including the name of the original document and the location of the document in the database, to conversion engine 240.

Conversion engine 240 retrieves the original document from database 250, and determines the storage format of the document if, for example, it was not indicated as part of the conversion request.

Conversion engine 240 passes conversion instructions to conversion engine interface 260. In this embodiment of the invention, the conversion instructions may comprise a reference to the location and the name of the original document, as well as information concerning the document-authoring application that created the original document. In another embodiment of the invention, the conversion instructions may comprise different information, such as conversion parameters or the storage format of the document to be produced.

Conversion engine interface 260 calls document authoring application interface 270, and passes it the conversion instructions compiled by conversion engine 240. In this embodiment of the invention, communications between conversion engine interface 260 and document authoring application interface 270 provide a means for conversion engine 240 to manipulate a subset of the functionality of document authoring application 280 as if the functionality were native to conversion engine 240.

Document authoring application 280 receives the conversion instructions, and generates raw conversion results. In this embodiment of the invention, the raw conversion results may comprise a set of one or more files. For example, each file in the set of files may correspond to an individual page in the original document. Within the set of files, visual presentation properties of the original document are preserved. In another embodiment of the invention, the raw conversion results may comprise a different type of result set.

Document authoring application interface 270 passes the raw conversion results to conversion engine interface 260, which returns them to conversion engine 240.

Conversion engine 240 assembles the raw conversion results into a document formatted according to Hypertext Markup Language. In this embodiment of the invention, the assembled document may comprise a single file. In another embodiment of the invention, the HTML document may comprise a set of two or more HTML files. The produced HTML document preserves the visual appearance of the original document.

Conversion engine 240 stores the HTML document in database 250. In this embodiment of the invention, the HTML document is stored in the same location in the database as the original document. In another embodiment of the invention, the HTML document may be stored in another location, another database or data repository, or it may not be stored on any persistent storage device.

Conversion engine 240 passes information concerning the produced HTML document to server pages 230. In this embodiment of the invention, the HTML document information comprises a reference to the HTML document name and its storage location in the database. In another embodiment of the invention, the HTML document information may comprise different information, such as database login information or the name of a target browser application.

Server pages 230 receive the HTML document information from conversion engine 240 and generate document conversion response 290 in a format usable by web server 220.

Web server 220 receives the generated document conversion response 290 and returns it as a reply to document conversion request 210. In this embodiment of the invention, document conversion response may comprise a Uniform Resource Locator (URL) reference to the produced HTML document.

In an alternative embodiment of the invention, the various components of document converter 200 may be colocated on one computer system or distributed across multiple computer systems, and any one component may comprise another.

Figure 3:
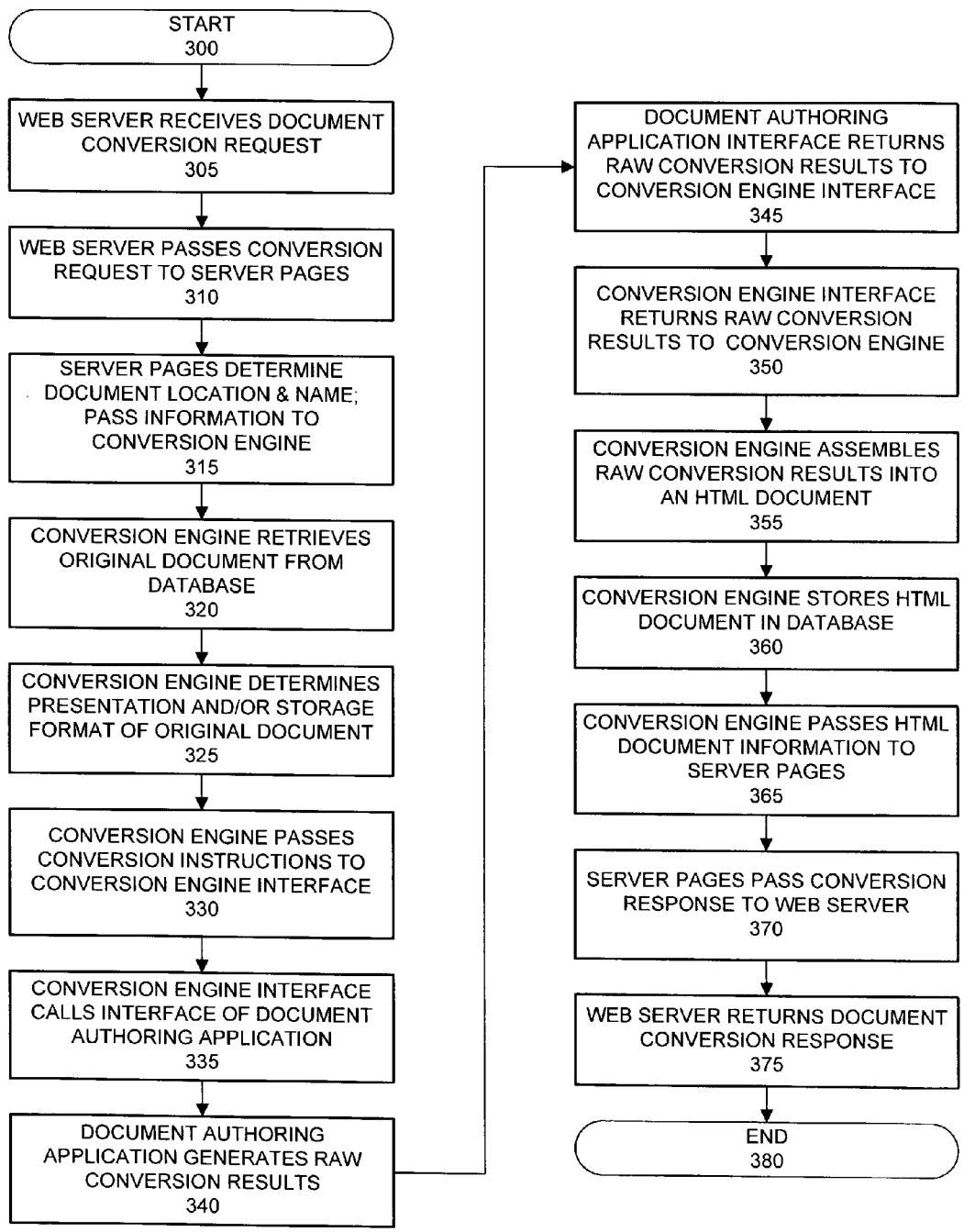
FIG. 3 is a flowchart illustrating one method of converting the storage format of a document, in accordance with an embodiment of the invention.

FIG. 3 is a flowchart illustrating one method of producing a document formatted according to Hypertext Markup Language from an electronically stored original document, in accordance with an embodiment of the invention.

State 300 is a start state. In state 305, a web server, configured to receive and send document conversion requests and responses as part of a document converter, receives a document conversion request. The request may be provided in the form of a Uniform Resource Locator (URL) comprising a reference to an original document. In the embodiment of FIG. 3, the web server receiving the request may be an Apache Hypertext Transfer Protocol (HTTP) server.

In state 310, the web server passes the conversion request to server pages. In this embodiment of the invention, the web server interacts with JavaServer Pages™ (JSP™).

In state 315, the server pages determine the storage location of the original document from the conversion request, along with any other conversion instructions in the request, configure the information contained in the conversion request into a format that can be utilized by conversion engine, and pass the information to the conversion engine.

In this embodiment of the invention, the conversion request comprises the filename of the original document, and its storage location in a database. As one skilled in the art will recognize, the conversion request may contain other types of information such as conversion parameters for guiding the conversion process, information concerning the document storage format of the original document, database access security permissions, instructions concerning the storage location of the produced HTML document, etc.

In state 320, the conversion engine, using the information received from the server pages, retrieves the original document from the database.

In state 325, the conversion engine determines the electronic storage format and/or the presentation format of the original document. In this embodiment of the invention, the storage format of the original document may be Microsoft® PowerPoint or some other component of the Microsoft Office family of products. The electronic storage format of the original document in another embodiment of the invention may be another type, such as Word, Excel or some other Office program. In one alternative embodiment of the invention, the presentation format and/or storage format of the original document may be signaled as part of the document conversion request or by some other element of the document converter.

In state 330, the conversion engine passes conversion instructions to the conversion engine interface. The conversion instructions may comprise a reference containing the location and the name of the document to be converted, information concerning the storage format of the original document, and information concerning the document-authoring application that created the original document. In another embodiment of the invention, the conversion instructions may comprise the original document or instructions concerning the storage format of the document to be produced. In this embodiment of the invention, the conversion engine interface may be implemented as a Java™ Native Interface (JNI).

In state 335, the conversion engine interface calls the interface of the document-authoring application that created the original document, and passes it the conversion instructions. In this embodiment of the invention, the document-authoring application interface may comprise the C++ application programming interface (API) of Microsoft® PowerPoint or other application used to produce the original document. In another embodiment of the invention, the document-authoring application interface may be another type.

As one skilled in the art will recognize, the interaction of the conversion engine interface and the document-authoring application interface provides a means for the conversion engine to communicate with and manipulate a subset of the functionality of the document-authoring application, which may be implemented in a computer programming language or on a computing platform that differs from the language or computing platform used to implement the conversion engine.

In state 340, the document-authoring application generates raw conversion results from the original document. The generated raw conversion results preserve the visual presentation properties of the original document.

In this embodiment of the invention, the document-authoring application may be a subset of the functionality of Microsoft® PowerPoint, and the raw conversion results may be a set of one or more files formatted according to Hypertext Markup Language (HTML). The generated Hypertext Markup Language may comprise instructions targeted for a specific browser application or a proprietary computing platform. In another embodiment of the invention, the document-authoring application may be a subset of the functionality of a different application, and the raw conversion results may be a set of one or more files formatted according to a different format, such as Joint Photographic Experts Group File Interchange Format (JPEG), Graphics Interchange File (GIF), Portable Network Graphics (PNG) or some other format for displaying graphical information.

In one embodiment of the invention, each file in the generated set of files may correspond to an individual page in the original document.

In state 345, the document-authoring application interface returns the raw conversion results to the conversion engine interface.

In state 350, the conversion engine interface returns the raw conversion results to the conversion engine.

In state 355, the conversion engine assembles the raw conversion results into a document formatted according to Hypertext Markup Language. In this embodiment of the invention, the conversion engine may produce a single HTML file comprising the visual presentation properties of the original document, as characterized by the document-authoring application that created the original document.

In one alternative embodiment of the invention, the conversion engine may produce a set of files containing two or more HTML files comprising the visual presentation properties of the original document. In another alternative embodiment, a transportable file format other than HTML may be applied to the raw conversion results.

In the illustrated method of the invention, the Hypertext Markup Language comprising the assembled HTML document may be browser application, operating system, and computing platform neutral. In another embodiment of the invention, the assembled HTML document may comprise Hypertext Markup Language targeted for a specific particular browser, operating system or computing platform.

In state 360, the conversion engine stores the HTML document in a database. In this embodiment of the invention, the HTML document may be stored in the same database as the original document. In another embodiment of the invention, the HTML document may be stored in an alternate location.

In state 365, the conversion engine passes information concerning the HTML document to the server pages. In this embodiment of the invention, the HTML document information comprises a reference to the name of the HTML document and its storage location in the database.

In state 370, the server pages format the HTML document information into a document conversion response suitable for use by a web server, and pass the conversion response, to the web server.

As one skilled in the art will recognize, the server pages provide a means of encapsulating logic used to dynamically generate web page content from the design and layout properties of a web page.

In state 375, the web server returns the document conversion response as a reply to the document conversion request. In this embodiment of the invention, the document conversion request is a Uniform Resource Locator (URL) reference to the produced HTML document.

From state 375, the document converter proceeds to state 380, which is an end state.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A computer implemented method of converting a document, the method comprising:

receiving from a client a uniform resource locator (URL) which includes a reference to a first document created by a document-authoring application;

receiving the first document;

determining a first storage format of the first document;

determining a first presentation format of the first document, wherein the first presentation format is unique to the document-authoring application;

identifying a conversion module configured to produce, from the first document, a second document formatted according to a second storage format and the first presentation format, wherein the second storage format is browser neutral and wherein the conversion module comprises an application programming interface (API) of the document authoring application;

invoking the conversion module through the API of the document-authoring application to produce the second document from the first document; and sending to the client a browser-readable file based on the second document;

wherein using the API of the document-authoring application to invoke the conversion module allows the first presentation format to be preserved while converting the first document to the second document formatted according to the second storage format.

2. The method of claim 1, wherein:

the first storage format of the first document is Microsoft PowerPoint;

the first presentation format of the first document is Microsoft PowerPoint; and the second storage format of the second document is Hypertext Markup Language (HTML).

3. The method of claim 1, wherein the first presentation format is one of: Microsoft PowerPoint, Microsoft Word, Microsoft Excel, Microsoft Project and Microsoft Visio.

4. The method of claim 1, wherein the first storage format is one of: Microsoft PowerPoint, Microsoft Word, Microsoft Excel, Microsoft Project and Microsoft Visio.

5. The method of claim 1, wherein the second storage format is Hypertext Markup Language (HTML).

6. The method of claim 1, wherein the second storage format is one of: Graphic Interchange Format (GIF), Joint Photographic Experts Group File Interchange Format (JPEG) and Portable Network Graphics (PNG).

7. An automated method of converting an electronically stored document, the method comprising:

receiving from a client a uniform resource locator (URL) which includes a reference to an original document created by a document-authoring application;

receiving a request to convert the original document;

retrieving the original document;

determining a storage format of the original document;

identifying a first module configured to convert a document from the storage format, wherein the first module comprises an application programming interface (API) of the document authoring application;

invoking the first module through the API of the document-authoring application to convert the original document into a set of files;

wherein using the API of the document-authoring application to invoke the first module allows the presentation format to be preserved while converting the original document into the set of files;

from the set of files, producing a converted document, wherein said converted document preserves the presentation format of the original document, and wherein the converted document is browser neutral;

storing said converted document;

returning a reference to said converted document in response to the request; and sending to the client a browser-readable file based on said converted document.

8. The method of claim 7, wherein the application format type is one of: Microsoft PowerPoint, Microsoft Word, Microsoft Excel, Microsoft Project and Microsoft Visio.

9. The method of claim 7, wherein the set of files comprises one or more files formatted according to Dynamic Hypertext Markup Language (DHTML).

10. The method of claim 7, wherein the set of files comprises one or more files formatted according to Hypertext Markup Language (HTML).

11. The method of claim 7, wherein the set of files comprises one or more files formatted according to one or more of: Joint Photographic Experts Group File Interchange Format (JPEG), Graphic Interchange Format (GIF) and Portable Network Graphics (PNG).

12. The method of claim 7, wherein said converted document is formatted according to Hypertext Markup Language (HTML).

13. A document conversion system comprising:

an application server configured to:
receive from a client a uniform resource locator (URL) which includes a reference to a first document created by a document-authoring application; and
receive a request to convert the first document having a first storage format and a first presentation format into a second document having a second storage format and the first presentation format;

a document converter, comprising:
a first conversion module configured to convert the first storage format while preserving the first presentation format, wherein the first module comprises an application programming interface (API) of the document authoring application; and
a conversion engine configured to initiate conversion of the first document, by the first conversion module, from the first storage format into the second storage format, wherein the second storage format is browser neutral;

a database configured to store the second document; and wherein the application server is further configured to send to the client a browser-readable file based on the second storage format, and wherein using the API of the document-authoring application to initiate conversion allows the first presentation format to be preserved while converting the storage format of the first document from the first storage format to the second storage format.

14. The document conversion system of claim 13, wherein the first storage format is the storage format of one of: Microsoft PowerPoint, Microsoft Word, Microsoft Excel, Microsoft Project and Microsoft Visio.

15. The document conversion system of claim 13, wherein the first presentation format is the presentation format of one of: Microsoft PowerPoint, Microsoft Word, Microsoft Excel, Microsoft Project and Microsoft Visio.

16. The document conversion system of claim 13, wherein the second storage format is the Hypertext Markup Language (HTML) storage format.

17. The document conversion system of claim 13, wherein said conversion engine is configured to automatically determine the first presentation format.

18. The document conversion system of claim 13, wherein said conversion engine is configured to automatically determine the first storage format.

19. A document converter, comprising:

a server configured to:
- receive from a client a uniform resource locator (URL) which includes a reference to a first document created by a document-authoring application; and
- receive a request to convert the first document having a first storage format and a first presentation format;

a first module configured to convert the first document into a set of files having a second storage format, while maintaining the first presentation format, wherein the second storage format is browser neutral and wherein the first module comprises an application programming interface (API) of the document authoring application;

wherein the first module can be invoked through the API of the document-authoring application;

a conversion engine configured to produce, from the set of files, a final document in a final storage format; and an interface to a database, wherein the database is configured to store the final document;

wherein the server is further configured to send to the client a browser-readable file based on the second storage format, and wherein using the API of the document-authoring application to invoke the first module allows the first presentation format to be preserved while converting the first document into the set of files having the second storage format.

20. The document converter of claim 19, wherein the first module comprises a subset of the functionality of one of: Microsoft PowerPoint, Microsoft Word, Microsoft Excel, Microsoft Project and Microsoft Visio.

21. The document converter of claim 19, wherein said conversion engine is configured to automatically determine said first presentation format.

* * * * *